United States Patent [19]

Tanaka

[11] Patent Number: 4,838,100

[45] Date of Patent: Jun. 13, 1989

[54] STARTER FOR ENGINE

[75] Inventor: Toshinori Tanaka, Hyogo, Japan

[73] Assignee: Mitsubishi Denki Kabushiki Kaisha, Tokyo, Japan

[21] Appl. No.: 159,377

[22] Filed: Feb. 23, 1988

[30] Foreign Application Priority Data

Feb. 23, 1987 [JP] Japan .................................. 62-40962

[51] Int. Cl.[4] ......................... F02N 15/06; H01F 7/02; H02K 21/28

[52] U.S. Cl. ........................................ 74/7 A; 74/7 R; 74/7 C; 290/38 R; 310/78; 310/92; 310/154; 335/126

[58] Field of Search ..................... 74/6, 7 R, 7 A, 7 C; 310/78, 92, 154, 237; 335/126; 290/38 R

[56] References Cited

U.S. PATENT DOCUMENTS

| | | | |
|---|---|---|---|
| 609,973 | 8/1898 | Neeley | 192/45 |
| 3,568,309 | 3/1971 | Preece | 310/234 X |
| 4,216,400 | 8/1980 | Lynch et al. | 310/154 |
| 4,327,300 | 4/1982 | Hoven | 74/7 C X |
| 4,383,193 | 5/1983 | Tomite et al. | 310/154 |
| 4,510,407 | 4/1985 | Tomite | 74/7 R X |
| 4,553,441 | 11/1985 | Hamand et al. | 74/7 R |
| 4,687,608 | 8/1987 | Eino | 335/306 X |
| 4,695,735 | 9/1987 | Tallis, Jr. et al. | 74/7 R X |

FOREIGN PATENT DOCUMENTS

| | | |
|---|---|---|
| 49-115823 | 9/1974 | Japan . |
| 62-00729 | 10/1987 | Japan . |

*Primary Examiner*—Allan D. Herrmann

*Attorney, Agent, or Firm*—Wolf, Greenfield & Sacks

[57] ABSTRACT

A coaxial type starter used to start an engine of a vehicle is disclosed. The starter includes a d.c. motor having an armature rotary shaft which incorporates an overrunning clutch and six or more magnetic poles which are defined by permanent magnets disposed circumferentially on the inner surface of a tubular yoke for forming a magnetic path. Provision of six or more magnetic poles on the inner surface of the yoke enables a reduction in the thickness of the yoke and the diametrical thickness of the armature core since the required thicknesses of the yoke and the armature core are inversely proportional to the number of field magnetic poles. Accordingly, it is possible to incorporate the overrunning clutch inside the armature rotary shaft without any increase in the overall diameter of the starter. Thus, it is possible to achieve a reduction in the overall size of the starter.

10 Claims, 3 Drawing Sheets

STARTER FOR ENGINE

BACKGROUND OF THE INVENTION

1. Field of the Invention

The present invention relates to a starter for an engine and, more particularly, to a coaxial type starter used to start the engine of a vehicle.

2. Description of the Prior Art

Conventional starters used to start the engine of a vehicle have heretofore been arranged as shown in FIG. 3.

The conventional starter 1 shown in FIG. 3 comprises a d.c. motor 2, an overrunning clutch 4 slidably fitted on an extended shaft portion *3a* of an armature rotary shaft 3, and a shift lever 8 having one end thereof engaged with a plunger rod 6 of an electromagnetic switch 5 disposed at one side of the d.c. motor 2 and the other end thereof engaged with an annular member 7 secured to the overrunning clutch 4. The shift lever 8 causes the overrunning clutch 4 to slide on the extended shaft portion 3a of the armature rotary shaft 3.

However, the conventional starter 1 needs the shift lever 8 and the electromagnetic switch 5 which actuates the shift lever 8 and also turns on the power supply for the d.c. motor 2 is disposed at the side of the d.c. motor 2, that is, the starter 1 has the so-called biaxial arrangement. Therefore, the kinds of engine layout that can be adopted in designing a vehicle have heretofore been restricted to a substantial extent.

In order to avoid the above-described problem, it has been proposed that the electromagnetic switch be disposed at one axial end of the d.c. motor to thereby give the starter a simple configuration such as a relatively long and narrow cylindrical shape. According to this proposition, the starter is basically arranged such that the plunger rod of the electromagnetic switch which has heretofore been used to actuate the shift lever extends into the passage extending as far as the output rotary shaft inside the armature rotary shaft. Since the armature rotary shaft of the d.c. motor and the rod of the electromagnetic switch are disposed on the same axis, this starter is known as the coaxial type starter.

In order to shorten the axial length and thereby reduce the size of the coaxial type starter having the above-described basic arrangement, a starter for an engine has been proposed wherein an overrunning clutch is incorporated inside an armature rotary shaft which constitutes an armature of a d.c. motor.

In the engine starter having the overrunning clutch incorporated in the armature rotary shaft, an annular recess is formed on the inner wall of the armature rotary shaft, and a plurality of cam surfaces are formed on the cylindrical wall of the recess. Thus, there are wedge-shaped spaces which are defined between the cam surfaces and a clutch inner member received inside the armature rotary shaft, and a roller and a spring for pressing the roller are disposed in each of the wedge-shaped spaces. In other words, this starter is arranged such that the armature rotary shaft also serves as a clutch outer member of the overrunning clutch.

The above-described conventional engine starter suffers, however, from the following problems. Namely, if the overrunning clutch is disposed inside the armature rotary shaft in order to reduce the overall size or length of the starter, the outer diameter of the armature rotary shaft is significantly increased, resulting disadvantageously in an increase in the overall diameter of the engine starter.

SUMMARY OF THE INVENTION

In view of the above-described circumstances, it is a primary object of the invention to provide a starter for an engine which has the overrunning clutch installed inside the armature rotary shaft and which is small in diameter.

To this end, the present invention provides a starter for an engine which includes a d.c. motor having an armature rotary shaft which incorporates an overrunning clutch and six or more magnetic poles which are defined by permanent magnets disposed circumferentially on the inner peripheral surface of a tubular yoke and forming a magnetic path.

By virtue of the above-described arrangement wherein six or more magnetic poles are provided on the inner peripheral surface of the yoke, it is possible to reduce the thickness of the yoke and the thickness of the armature core since the required thicknesses of the yoke and the armature core are inversely proportional to the number of field magnetic poles. Accordingly, the provision of the overrunning clutch inside the armature rotary shaft does not lead to any great increase in the overall diameter of the starter.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

The starter for an engine according to the present invention will be described hereunder in detail by way of one preferred embodiment and with reference to the accompanying drawings.

Figure 1:
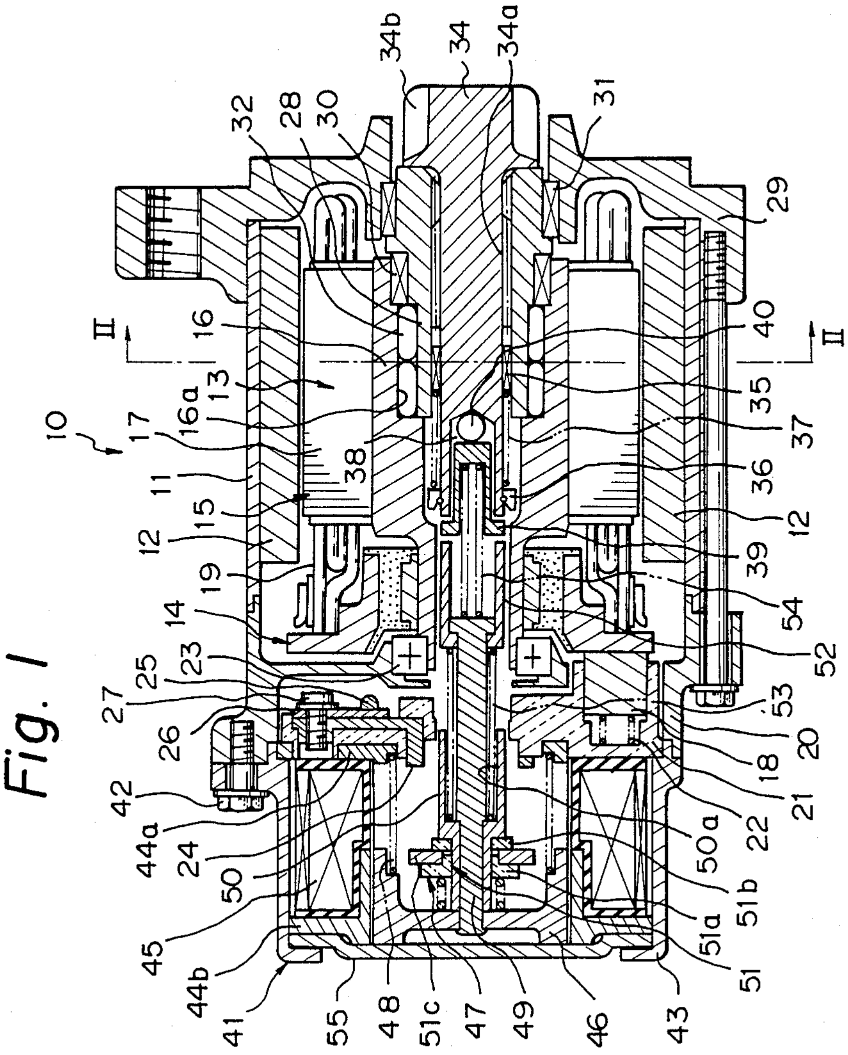
FIG. 1 is a sectional view of one embodiment of the starter for an engine according to the present invention.
Figure 2:
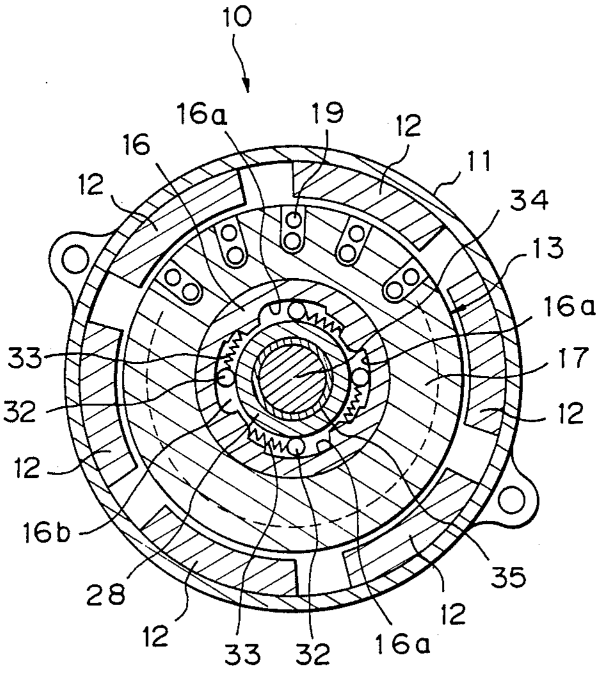
FIG. 2 is a sectional view taken along the line II—II of FIG. 1.
Figure 3:
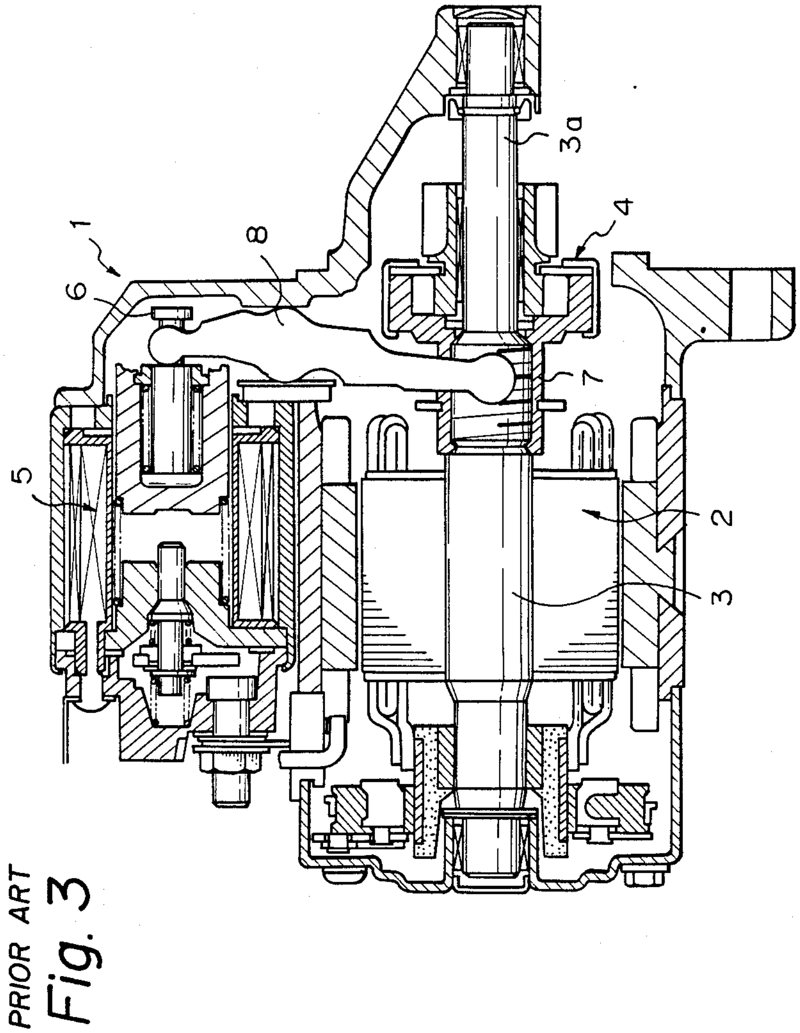
PRIOR ART Fig. 3
FIG. 3 is a sectional view of a conventional starter for an engine.

FIGS. 1 and 2 show a starter 10 for an engine according to one embodiment of the present invention.

The engine starter 10 of this embodiment includes a d.c. motor 15 which has six magnetic poles defined by permanent magnets rigidly disposed at certain spacings in the circumferential direction on the inner peripheral surface of a yoke 11. The yoke 11 forms a magnetic circuit and also defines an outer wall of the starter 10. The d.c. motor 15 also has an armature 13 rotatably disposed in the center of the yoke 11 and a face type commutator 14 provided at one axial end of the armature 13.

The armature 13 of this d.c. motor 15 is composed of a hollow armature rotary shaft 16 and an armature core 17 mounted on the outer periphery of the armature rotary shaft 16. An annular recess 16b is formed on the inner wall of the hollow armature rotary shaft 16. A plurality of circumferentially spaced cam surfaces 16a are formed on the cylindrical wall of the recess. The face type commutator 14 is fitted on the periphery of one end portion, that is, the left-end portion as viewed in FIG. 1, of the armature rotary shaft 16. The commutator 14 consists of a multiplicity of segments which are disposed on a surface vertical to the axis of the armature rotary shaft 16 so that the segments are in sliding contact with a plurality of brushes 18 to effect commutation. Each segment is connected to one end of an armature coil 19 which is wound around the armature core 17.

The brushes 18 are supported by a brush holder 21 made of a plastic material which is disposed on the outside of a rear bracket 20 formed separately from the yoke 11 and rigidly fitted thereto at a spigot joint portion thereof. Each brush 18 is pressed against the slide surface of the commutator 14 by a spring 22 through an opening formed in the rear bracket 20. A bearing 23 is fitted to the inner surface of the flange portion formed integral with the rear bracket 20 and is adapted to support the rear end portion of the armature rotary shaft 16, that is, to support the commutator 14 mounted on that end portion thereof. The brush holder 21 is composed of a fixed contact 24 which is connected to a terminal (not shown) and which is formed integral with the rear end portion of the brush holder 21 by an insert molding process, and a terminal 26 which is rigidly secured to the fixed contact 24 by means of a screw 27 and which has a plus-side lead wire 25 for the brushes 18 welded thereto.

The cam surfaces **16*a* that are formed on the cylindrical wall of the recess inside the armature rotary shaft 16 constitute an overrunning clutch mechanism. More specifically, a tubular inner member 28 is received in the hollow portion of the armature rotary shaft 16 in such a manner that the inner member 28 is rotatably supported by the armature rotary shaft 16 and a front bracket 29 which is secured to the front end (the right-hand end as viewed in FIG. 1) of the yoke 11 through bearings 30 and 31, respectively. Thus, a plurality of wedge-shaped spaces 16*b* are defined between the outer peripheral surface of the inner member 28 and the cam surfaces 16*a* formed on the cylindrical wall of the recess inside the armature rotary shaft 16. In each wedge-shaped space 16*b* is disposed a roller 32 for providing engagement between the cam surface 16*a* and the outer peripheral surface of the inner member 28 and a spring 33 which presses the roller 32 in the direction in which said engagement is accomplished. Thus, the overrunning clutch mechanism comprises the cam surfaces 16*a*, the inner member 28, the rollers 32 and the springs 33, and the armature rotary shaft 16** itself also serves as a clutch outer member which functions as a part of the mechanism.

A pinion shaft 34 which defines an output rotary shaft is disposed in a passage formed inside the tubular inner member 28. Helical splines **34*a* which are respectively formed on the inner surface of the inner member 28 and the peripheral surface of the pinion shaft 34 are meshed with each other for rotation therewith but not in relation thereto and for axial movement in relation thereto. A pinion 34b which is engageable with a ring gear (not shown) of the engine is formed integral with the front end portion of the pinion shaft 34. The pinion shaft 34 is supported by a bearing 35 which is rigidly fitted on the inner wall of the rear end portion of the inner member 28. A spring 37 for returning the pinion shaft 34 is disposed between the bearing 35 and a retaining ring 36 which is secured to the periphery of the rear end portion of the pinion shaft 34**.

The pinion shaft 34 has a recess 38 formed in the rear end face thereof. A first holder 39 which is in the shape of a tube and one end of which is closed is loosely fitted in the recess 38. A steel ball 40 designed to bear a thrust is disposed between the closed end of the first holder 39 and the innermost wall of the recess 38.

The engine starter 10 according to this embodiment further includes an electromagnetic switch 41 (hereinafter referred to simply as "switch") which causes the output rotary shaft, i.e., the pinion shaft 34, to slide and, enables power supply to the d.c. motor 15 from a battery when a key switch (not shown) of the vehicle is turned on. The switch 41 is connected to the rear bracket 20 by means of a bolt 42. The switch 41 consists of a coil 45 which is wound on a plastic bobbin supported by forward and rearward cores **44*a*, 44*b*, the cores 44*a* and 44*b* forming a magnetic path together with a casing 43, a plunger 46 slidably disposed in the central opening formed in the bobbin, and a moving assembly 47 secured to the plunger 46. The plunger 46 is forced from a coil spring 48 disposed between the plunger 46 itself and the forward core 44*a*** to return to its original position, as shown in FIG. 1, when the key switch is turned off.

The moving assembly 47 incorporates a rod 49 which has one end secured to the plunger 46, the other end facing the first holder 39 which is provided on the rear end of the pinion shaft 34. Rigidly secured to the periphery of that end portion of the rod 49 is a third holder 50 having an annular space **50*a* within it which opens toward the pinion shaft 34. A movable contact member 51 is slidably fitted on the periphery of the third holder 50, the contact member 51 having a movable contact 51*c* sandwiched between two insulators 51*a*, 51*b*. A second holder 52 is axially slidably fitted on the other end portion of the rod 49. Disposed between the second holder 52 and the bottom of the annular space 50*a* is a spring 53 which urges the pinion shaft 34 forward, that is, rightward as viewed in FIG. 1. Also disposed between the forward end face of the rod 49 and the inner end wall of the first holder 39 is a spring 54 which urges the pinion shaft 34 forward. It should be noted that the reference numeral 55 denotes a non-magnetic plate which covers the rear end of the casing 43. The plate 55 serves as a stopper for stopping the plunger 46 when returned rearward and also defines the rear wall of the electromagnetic switch 41**.

The operation of the above-described engine starter 10 according to the embodiment will next be explained.

Whenever the key switch (not shown) is turned off, the coil 45 is in a deenergized state, and the plunger 46 is only influenced by the spring 48. Accordingly, the moving assembly 47 is located at its rearward position, and the plunger 46 is in contact with the plate 55. In this state, the fixed contact 24 and the movable contact 51c are separate from each other and the d.c. motor 15 is therefore at rest. The pinion shaft 34 is also located at its rearward position by virtue of the action of the spring 37.

When the key switch is turned on, the exciting coil 45 is energized and the plunger 46 is thereby urged to move forward. In consequence, the moving assembly 47 moves forward, the movable contact **51*c* consequently coming into contact with the fixed contact 24. Accordingly, the armature coils 19 are energized through the brushes 18 and the commutator 14, and the d.c. motor 15 is thus started. In the mean while, the pinion shaft 34 is pressed forward by the springs 53, 54**, thus causing the pinion 34*b* to mesh with the ring gear which is rigidly secured to the periphery of a flywheel of the engine at the same time as the starting of the d.c. motor 15. After the starting of the engine, when the pinion shaft 34 and the inner member 28 are reversely urged by the engine to rotate at a higher speed than that of the armature rotary shaft 16, the engagement between the inner member 28 and the armature rotary shaft 16 is canceled by the action of the one-way overrunning clutch, thus allowing the armature rotary shaft 16 to race. Upon completion of the starting of the engine, the key switch is turned off to cut off the power supply, so the moving assembly 47, together with the plunger 46, is returned rearward by the action of the spring 48 provided inside the electromagnetic switch 41 and the pinion shaft 34 is also returned rearward by the action of the spring 37.

In the engine starter 10 according to this embodiment, six magnetic poles 12 which are defined by permanent magnets are rigidly secured to the cylindrical wall in the yoke 11 at equal spacings as will be clear from FIG. 2, and therefore it is possible to reduce the thickness of the yoke 11 and that of the armature core 17. More specifically, since the required thicknesses of the yoke 11 and the armature core 17 are inversely proportional to the number of magnetic poles, there is no change in the level of driving force when the number of magnetic poles is increased to six, even if the thicknesses of these members are reduced. Accordingly, even if the outer diameter of the armature rotary shaft 16 is increased in order to accommodate the overrunning clutch therein, it is possible to avoid any increase in the overall diameter of the starter. The number of magnetic poles is not necessarily limited to six but may, of course, be more than six, for example, 8, 10 or more.

Since permanent magnets are used as magnetic poles, it is unnecessary to provide the connections which would otherwise be needed between a fixed contact of the switch and a field winding and between the field winding and a brush, and the structure is therefore simplified and assembly facilitated.

It should be noted that, if magnets made of high Hc and low Br material are employed as magnetic poles, the thickness of the magnets themselves can be reduced and the thicknesses of the yoke and the armature core can also be further reduced, and it is therefore possible to achieve a further reduction in the overall diameter of the starter.

As has been described above, in the engine starter of the present invention, six or more field magnetic poles are rigidly secured to the inner surface of the yoke and therefore it is possible to reduce the thicknesses of the yoke and the armature core even when an overrunning clutch is incorporated inside the armature rotary shaft. Accordingly, it is possible to avoid any increase in the overall diameter of the starter which would otherwise be caused by an increase in the diameter of the armature rotary shaft. In other words, it is possible to incorporate an overrunning clutch inside the armature rotary shaft without any increase in the outer diameter of the shaft and it is therefore possible to achieve a reduction in the overall size of the starter. Moreover, since according to the present invention the field magnetic- poles are formed using permanent magnets, there is no need to provide any connection therefor. Thus, it is possible to provide an engine starter which is simple in structure and easy to assemble.

Although the present invention has been described through specific terms, it should be noted here that the described embodiment is not necessarily exclusive and that various changes and modifications may be imparted thereto without departing from the scope of the invention which is limited solely by the appended claims.

What is claimed is:

1. In a starter for an engine that includes:

a d.c. motor having a tubular yoke for forming a magnetic path, an armature rotary shaft disposed inside said yoke and having an interior passage, and magnetic pole means which is disposed on the inner surface of said yoke;

an overrunning clutch provided inside the interior passage of said armature rotary shaft;

an output rotary shaft axially slidably supported inside the interior passage of said armature rotary shaft, said output rotary shaft receiving rotational force from said armature rotary shaft through said overrunning clutch; and an electromagnetic switch disposed coaxially of said armature rotary shaft comprising actuating means connected thereto, said actuating means disposed coaxially of said output rotary shaft;

said electromagnetic switch causing said rod to move axially, to urge said output rotary shaft to move axially and also permitting power supply to said d.c. motor;

the improvement comprising;

said magnetic pole means comprising on the order of six magnetic poles defined by respective permanent magnets, and means for supporting the permanent magnets on the inner surface of said yoke with the permanent magnets being spacedly disposed about the circumference of the yoke, and with there being defined substantially the same spacing between all adjacently disposed permanent magnets.

2. A starter for an engine as claimed in claim 1 including a commutator means disposed at one axial end of the armature rotary shaft.

3. A starter for an engine as claimed in claim 2 wherein said commutator means comprises a face-type commutator.

4. A starter for an engine as claimed in claim 1 wherein said armature rotary shaft interior passage has an annular recess including a plurality of circumferentially spaced cam surfaces forming part of said overrunning clutch.

5. A starter for an engine as claimed in claim 4 further comprising a tubular inner member disposed intermediate said armature rotary shaft and said output rotary shaft.

6. A starter for an engine as claimed in claim 5 wherein said overrunning clutch further comprises a roller for providing engagement between the cam surface and the outer peripheral surface of the inner member, and a spring which presses said roller in the direction in which said engagement is accomplished.

7. A starter for an engine as claimed in claim 6 wherein said output rotary shaft comprises a pinion shaft disposed in a passage formed inside the tubular inner member.

8. A starter for an engine as claimed in claim 7 wherein said tubular inner member and pinion shaft are inter-splined to permit axial displacement therebetween without relative rotation therebetween.

9. A starter for an engine as claimed in claim 1 said overrunning clutch includes a tubular inner member disposed about said output rotary shaft and intermediate said output rotary shaft and said armature rotary shaft interior passage.

10. A starter for an engine as claimed in claim 1 wherein said magnets are made of high Hc and low Br material.

* * * * *